United States Patent [19]

Wong

[11] Patent Number: 4,836,786

[45] Date of Patent: Jun. 6, 1989

[54] DEMONSTRATION CALCULATOR

[75] Inventor: Robert P. Wong, Kowloon, Hong Kong

[73] Assignee: Joseph Leeb Enterprises, Inc., Upper Saddle River, N.J.

[21] Appl. No.: 92,672

[22] Filed: Sep. 3, 1987

Related U.S. Application Data

[63] Continuation-in-part of Ser. No. 83,414, Aug. 7, 1987, Pat. No. D.300539.

[51] Int. Cl.[4] .................... G09B 19/00; G09B 19/02; G06C 5/02

[52] U.S. Cl. .................... 434/365; 434/201; 434/202; 434/227; 235/1 D; 200/5 R; 200/5 A; 340/757; 340/712; 353/42; 353/44; 353/DIG. 3; 364/708

[58] Field of Search ............. 434/365, 201, 202, 227; 340/765, 705, 712, 757, 758, 365 VL; 353/DIG. 3, DIG. 5, 42, 44; 364/707, 708, 709; 200/5 R, 5 A, 292; 350/331 R; 235/1 D

[56] References Cited

U.S. PATENT DOCUMENTS

| | | | |
|---|---|---|---|
| 2,802,284 | 8/1957 | Dreisonstok et al. | 434/227 |
| 2,841,888 | 7/1958 | Grimmes | 434/219 |
| 3,531,193 | 9/1970 | Diehl | 353/DIG. 5 X |
| 3,832,050 | 8/1974 | Johannsen | 353/42 |
| 4,154,007 | 5/1979 | Judd | 434/365 |
| 4,224,615 | 9/1980 | Penz | 340/765 X |
| 4,468,203 | 8/1984 | Gimmestad et al. | 434/228 |
| 4,501,938 | 2/1985 | Kawauchi | 200/5 A |
| 4,529,968 | 7/1985 | Hilsun et al. | 340/765 |
| 4,675,787 | 6/1987 | Suwa | 364/708 X |
| 4,711,992 | 12/1987 | Sekine | 200/5 A X |
| 4,794,234 | 12/1988 | Kinugawa et al. | 235/1 D |

FOREIGN PATENT DOCUMENTS 0122528  7/1983  Japan .................... 353/DIG. 5 X

OTHER PUBLICATIONS

HFD—Retailing Home Furnishing, page 75—Panasonic Solar Calculator with transparent keyboard.
Catalog 1—Smart Products by Polyflame Concepts, ASI #78897 (1987), pp. 1,3 Product identified in Jan. 1987 Distributor Price List (also enclosed).
Catalog 2—1987 The Catalog, cover and p. B4 (both sides).
Catalog 3—1988 Tagmaster Advertising Specialties Showcase, cover and p. 5.
Catalog 4—Enterprex Int'l Corp. promotional sheet (undated) Possibly related product identified in price list, p. 11, dated 12/31/86.
Design patent application Ser. No. 083,414 filed Aug. 7, 1987.

*Primary Examiner*—Robert E. Garrett
*Assistant Examiner*—Carl D. Price
*Attorney, Agent, or Firm*—Amster, Rothstein & Ebenstein

[57] ABSTRACT

A hand-held calculator for use in conducting classroom demonstrations of the operation thereof, including use of the operation instruction key means. The calculator comprises a frame, a keyboard section, data processing means and a display section and where both the keyboard and display sections are transparent to permit images thereof to be projected on a screen for teaching purposes.

4 Claims, 3 Drawing Sheets

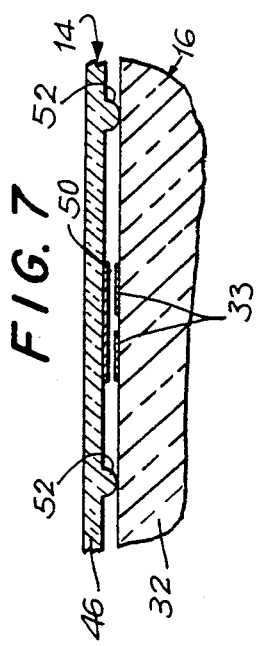
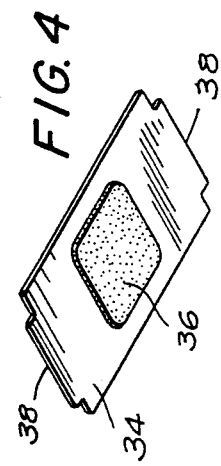
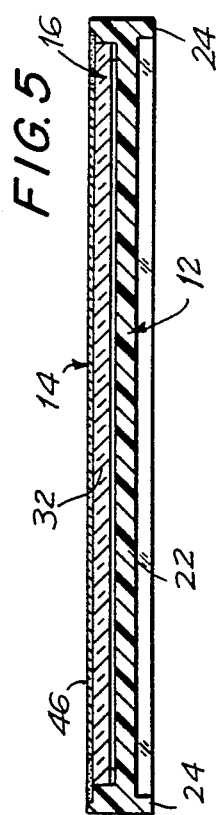
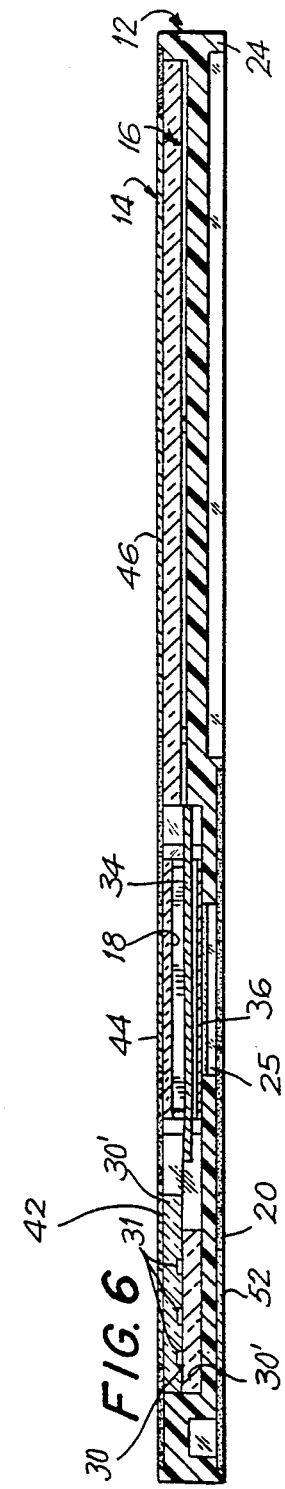

4,836,786

DEMONSTRATION CALCULATOR

STATUS OF RELATED APPLICATIONS

This is a continuation-in-part of Design Patent application Ser. No. 083,414, filed Aug. 7, 1987, now U.S. Pat. No. Des. 300,539.

BACKGROUND OF THE INVENTION

The present invention relates generally to hand-held calculators and more particularly to a hand-held demonstration calculator for classroom use and the like.

Generally the only devices available for facilitating classroom instruction in the operation of a calculator are calculators having very large displays themselves or providing a simulated display which produces an output, display that only remotely resembles the display actually seen on the conventional hand-held calculator. In addition to producing displays which are typically not well-suited for group viewing, these devices are typically of such high cost that their universal use is impractical.

U.S. Pat. No. 4,154,007 discloses a hand held calculator having a liquid crystal display supported on a transparent substrate so that portions of the LCD that are excited obstruct light passage while the remainder of the display is transparent—i.e., able to transmit light therethrough so as to enable projection of an enlarged image of the display onto a projection screen. While this device enables students to follow the results of the various keyboard operations performed by the instructor, it does not permit the students to see the actual keyboard manipulations themselves as they are performed by the instructor. In other words, the students see output only, not input, and thus cannot "put together" the manual and visual operations as necessary to acquire calculator proficiency. While this is a significant defect with respect to the data entry or integer keys, it is an even more serious defect with respect to the operation instruction keys which dictate how the calculator will act on the data entered. While the results of the data entry key activities are immediately reflected in the display and easily relatable on a logical basis to data entry key activity, the operation instruction key activities are typically not indicated in the display and can be quite difficult to discern simply from the changes in the display (for example, the effect of actuating a square root key on a lengthy decimal number). While in a simple, small calculator the operation instruction keys may be few, in larger, more complex (but still hand-held) calculators and especially in programmable calculators the number of operation instruction keys may far outnumber the number of data entry keys, and the students may require extensive training in the use thereof.

Accordingly, it is an object of the present invention to provide a calculator adapted so that both the output thereof and the input thereto on the operation instruction keys can be readily projected for group viewing by use of equipment freguently available in most classroom environments.

A further object is to provide such a calculator adapted to enable both the output display and the keyboard input thereto to be so projected.

A further object is to provide such a calculator which enables students to observe all keyboard input to and display output from the calculator.

It is also an object of the present invention to provide such a calculator which is inexpensive to produce, easy to operate, and of rugged construction.

SUMMARY OF THE INVENTION

It has now been found that the above and related objects of the present invention are obtained in a calculator for use in conducting classroom demonstrations of the operation thereof, including use of the operation instruction key means. Essentially, the calculator comprises a keyboard section, a data processing section and a display section, the keyboard and display sections both being transparent to permit images thereof to be projected on a screen for teaching purposes.

More particularly, the calculator comprises a housing having a transparent frame and a generally transparent film overlying the frame. The housing has a keyboard section, a data processing section, and a display section. The keyboard section includes a data entry subsection and an operation instruction subsection, the data entry subsection comprising a first set of key means accessible from the film and characterized by opaque data representations thereon for affording the introduction of data into the calculator and the operation instruction subsection comprising a second set of key means accessible from the film and characterized by opaque operation instruction representations thereon for affording the introduction of operation instructions into the calculator. At least the operation instruction subsection is essentially transparent to light transmission therethrough except for the operation instruction representations thereon. The data processing section comprises means for processing the data supplied thereto from the first set of key means according to the operation instructions supplied thereto from the second set of key means. The display section comprising means for displaying the output of the data processing means, including liquid crystal portions adapted to form numeric outputs that are opaque so as to obstruct light transmission therethrough when the liquid crystal portions are excited. The display section is essentially transparent to light transmission therethrough except for excited liquid crystal portions.

Preferably the data entry subsection is essentially transparent to light transmission therethrough except for the data representations thereon, whereby the calculator is adapted for use in classroom demonstrations of the operation thereof including use of the data entry keys.

In a preferred embodiment, the data processing section is disposed intermediate the keyboard and display sections, and the data processing means is operatively connected to the first and second sets of key means at one edge and to the display means at an opposed edge. Typically, the keyboard section is disposed at the bottom of the calculator and the display section is disposed at the top of the calculator.

The calculator may additionally comprise opaque solar cell means disposed in the data processing section intermediate the film and the data processing means. Means may be provided for transmitting a light beam through the display section and the operation instruction subsection for forming an enlarged image thereof.

The calculator additionally comprises a panel disposed intermediate the film and frame. The panel in the display section contains the liquid crystal portions, in the data processing section contains the data processing means, and in the keyboard section defines with the film the key means. In the keyboard section, preferably the film contains disposed on the back surface thereof opaque conductive ink defining the data and operational instruction representations, and the third panel, for each of the representations, contains at least one open electrical circuit element normally spaced from the film but adapted to be electrically closed by the conductive ink when an opposed representation is depressed toward the panel. The electrical circuit element is preferably essentially transparent to light transmission therethrough and extends to the data processing means. The data processing section is preferably essentially opaque to light transmission therethrough. Opaque membrane mean may be disposed within the data processing section of the housing behind the frame to preclude light transmission through the data processing section and to protect the data processing means from the possibly deleterious effect of light thereon.

The calculator preferably additionally comprises a transparent colored or shaded wand of generally rigid material configured and dimensioned for use in actuating one of the key means at a time, whereby the wand is adapted to indicate the location of the one key means being actuated thereby without blocking viewing of the representation of the key means therethrough.

BRIEF DESCRIPTION OF THE DRAWING

The above brief description, as well as further objects and features of present invention, will be more fully understood by reference to the following detailed description of the presently preferred, albeit illustrative, embodiments of the present invention when taken in conjunction with the accompanying drawing wherein;

FIG. 4 is a isometric view of the data processing means, taken from the rear;

FIG. 5 is a sectional view, to an enlarged scale, taken along the line 5—5 of FIG. 2;

FIG. 6 is a sectional view, to an enlarged scale, taken along the line 6—6 of FIG. 2; and FIG. 7 is a fragmentary sectional view, to a greatly enlarged scale, taken along the line 7—7 of FIG. 2.

DETAILED DESCRIPTION OF THE PREFERRED EMBODIMENTS

Figure 2:
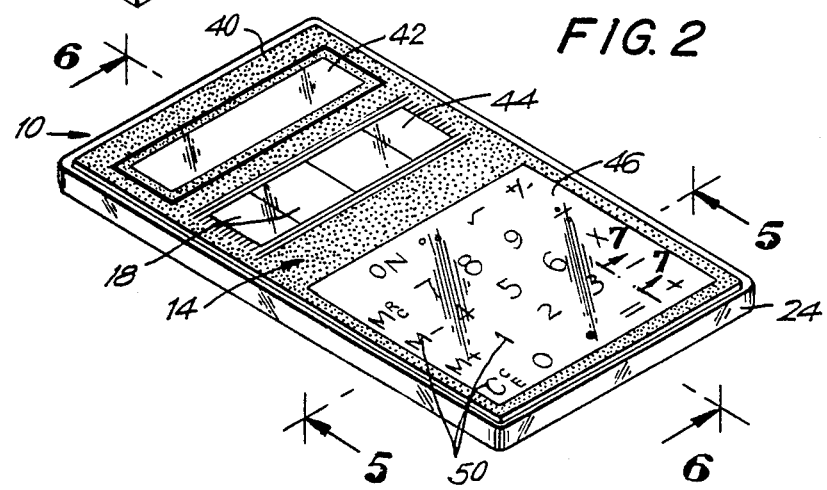
FIG. 2 is an isometric view of the calculator.
Figure 3:
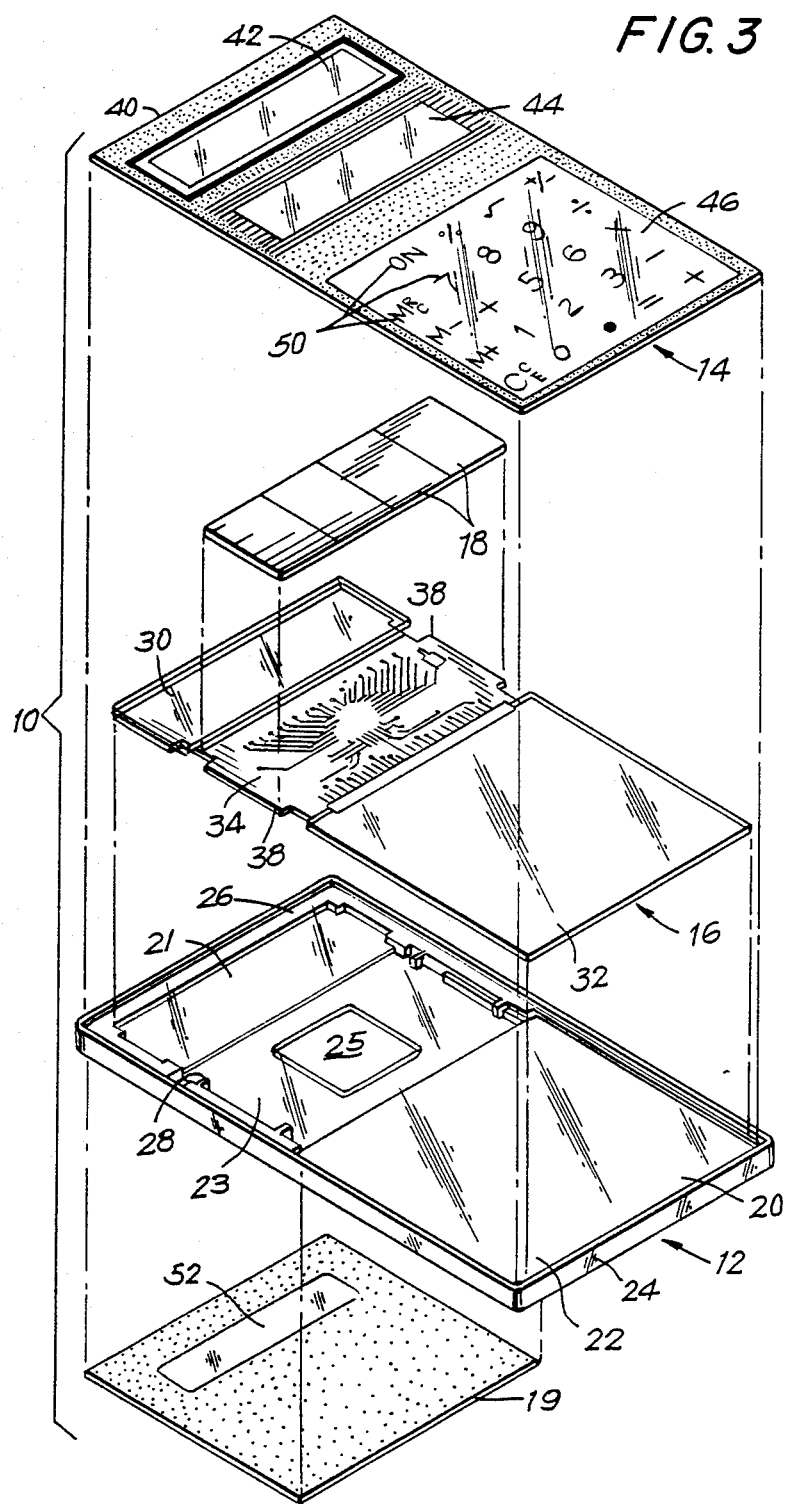
FIG. 3 is an exploded isometric view of the calculator.

Referring now to the drawing, and in particular to FIGS. 2 and 3 thereof, therein illustrated is a hand held calculator generally designated by the reference number 10. The housing 10 comprises in its principal aspects a generally rectangular body or frame generally designated by the reference numeral 12, a generally planar rectangular film generally designated by the reference numeral 14, and a generally rectangular panel generally designated by the reference numeral 16 disposed intermediate the film 14 and the frame 12. An array of solar or photovoltaic cells 18 is disposed intermediate the film 14 and panel 16 while a protective membrane 19 is disposed on the rear of the body 12.

The frame 12 comprises a thin rectangular sheet 20 of transparent glass defining a top or display section 21, a bottom or keyboard section 22, and an intermediate or data processing section 23 therebetween. The frame 12 further defines along its periphery a rim 24 extending substantially above and appreciably below the plane of the sheet 20. For reasons which will become apparent hereinafter, the sheet 20 defines a generally centrally disposed aperture 25 extending therethrough in the data processing section. The upper surface of the sheet adjacent the rim 24 defines various shoulders 26 and keys 28 to stabilize the positioning of the panel 16 on the upper surface thereof within rim 24 and provide dimensional stability and protection thereto.

The generally planar, substantially rectangular panel 16 has at its top a transparent display section 30 containing between its two generally planar substantially rectangular layers 30' a plurality of excisions or troughs 31 (see FIG. 6), each trough 31 containing a pool of liquid crystal material and being configured in sets of seven linear elements in the shape of a figure "8" as is conventional. Conductive paths (not shown) extend to each of the liquid crystal pools in their respective troughs 31 to afford excitation from the calculator circuitry so as to display output numerals on the display 30. As is known, excitation of the elements in a liquid crystal display causes the excited element to become relatively opaque to light transmission. The output shown in FIG. 1 displays opaque regions in the form of the number "124.", the remaining portions of the display 30 being transparent. The plane of the liquid crystal display is preferably parallel with the plane of the lower rim 24 of the body 12, thereby to insure that the liquid crystal display is parallel to any surface on which the calculator 10 may be rested.

The panel 16 further defines at the bottom thereof a transparent keyboard section 32. The keyboard section 32, for reasons which will become apparent later, defines a plurality of transparent circuit elements 33 (see FIG. 7). Such elements may be formed of aluminum drawn so thin that it becomes transparent or other materials combining essential transparency and conductivity. The elements are generally not visible to the naked eye unless the calculator is tilted to just the right angle.

Finally, the panel 16 further includes a printed circuit board (PCB) 34 disposed intermediate the upper display section 30 and the lower keyboard section 32. The printed circuit board 34 is provided with laterally extending wings 38 which engage the keys 28 of the frame 12 in order to stabilize the position of the panel 16 within the frame 12. Naturally, the printed circuit board 34 is connected at its upper edge to the troughs of the display 30 and at its bottom edge to the circuit elements 33 of the keyboard section 32.

An integrated circuit (IC) 36 is operatively connected to the printed circuit board 34, physically secured to the back of the printed circuit board (see FIG. 4), and configured and dimensioned to be received within the aperture of the frame 12 so that the IC 36 receives maximum protection. The integrated circuit 36 and printed circuit board 34 in combination form the data processing unit of the calculator. The printed circuit board 34 and IC 36 may be transparent, opaque or partially transparent and partially opaque.

The generally planar, substantially rectangular film 14 overlies the panel 16 and is configured and dimensioned to fit within the rim 24 of the frame 12. Partially for aesthetic reasons and partially to visually define the periphery of the calculator, the lower surface of the film 14 is provided with an opaque margin 40. The margin may be applied by painting, coating or other suitable techniques well known in the art and may utilize either an electrically conductive or non-conductive ink. The margin 40 may also extend between the various sections of the film 14, as defined hereinbelow, to mask their electrical connections from view and/or projection as well as for aesthetic reasons.

Like the panel 16, the film 14 is divided into an upper display section 42, an intermediate data processing section 44, and a lower keyboard section 46, each of these sections overlying and being aligned with the corresponding sections 30, 34 and 32, respectively, of the panel 16, and the corresponding sections 21, 23, 22, respectively, of the frame 12, in turn.

The display section 42 of the film 14 enables the panel display 30 to be read and/or projected therethrough, the border or margin of the film display section 42 optionally being provided with opaque areas to concentrate the user's attention on the active area of the panel display section 30. A set of solar or photovoltaic cells 18 (four are illustrated) is disposed over the printed circuit board 34 of the panel 16. with the middle portion 44 of the film 14 serving to protect and assist in maintaining in place the solar cells 18. The solar cells 18 are generally opaque to light transmission and thus serve to protect the printed circuit board 34 and the integrated circuit 36 therebelow from the deleterious effects of light thereon. Instead of, or in addition to the solar cells 18, compact batteries may be used to power the calculator.

The keyboard section 46 of the film 14 is disposed at the bottom thereof and contains two subsections. A data entry subsection is characterized by representations of the integers "0" through "9" and the decimal point, and a operation instruction subsection is characterized by all of the other representations 50 on the keyboard section 46. The operation instruction representations illustrated include the four basic mathematical functions, various memory functions, a clear and clear entry- key, and various keys for percentage, square root, and opposite sign functions. These functions have been selected for this particular calculator and obviously other functions may be substituted or added, and some of these functions may be deleted, as desired depending upon the intended use of the calculator, the size and complexity desired, etc.

Each representation 50 is defined by a pattern of opaque conductive ink on the back surface of the film 14. Forming a square about each of the representations are a series of four tiny bosses or projections 52 (see FIG. 7) which extend downwardly from the rear surface of the film 14 and contact the upper surface of the keyboard section 32 of the panel 16. The projections 52 are of sufficient length to bias the conductive ink pattern 50 forming the representation at the center thereof away from the circuit element 33 on the upper surface of the panel 16 and hence to normally maintain the circuit element 33 open. On the other hand, the film 14 is sufficiently resiliently deformable that fingertip pressure on the upper surface of the film 14 above a given representation 50 will suffice to depress the conductive ink pattern 50 of film 14 until it is in contact with the circuit element 33 of panel 16, thereby to close the circuit element 33 so that the data processing unit is informed of the election of that representation. Removal of finger pressure from the elected representation 50 results in a return to planarity by the resilient film 14 in that region, a separation of the conductive ink defining the representation 50 from the circuit element 33 of the panel 16, and thus a reopening of that circuit element 33. It will be appreciated that the film 14 is nonconductive except for the representations 50 on the back surface thereof (and optionally the electrically non functional margins 40 printed thereon).

While the extension of the rim 24 below the level of sheet 20 of frame 12 provides a certain level of protection for the sensitive display, integrated circuit and printed circuit board elements 30, 34 and 36, enhanced protection is provided by the use of a membrane 19 on the back of the sheet 20 within the rim 24. The membrane 19 is disposed under the display and data processing sections 21, 23 of the frame 12. The upper surface of the membrane 19 may be printed to provide opacity in the region of the data processing section 23, thereby to protect the printed circuit board 34 and integrated circuit 36 from the possibly deleterious effects of lights thereon. Additionally, the opacity may extend into the periphery of the display section so that upwardly projected light passes only through a window 52 thereof, thus enabling projection only of the desired or necessary part of the panel display section 30. If desired, membrane 19 may extend beneath the keyboard section of the calculator as well, this portion of the membrane, of course, remaining transparent.

While the body 12 including rim 24 assists in physically maintaining the various components of the calculator in place as an integrated whole, physical connections may also be secured by conventional means, such as adhesives, using only transparent adhesives in areas designated herein as transparent.

It will be appreciated that the calculator described above has three main sections, a transparent display section at the top, a data processing section in the middle, and a keyboard section at the bottom. Light transmission upwardly through the keyboard section of the calculator passes through the frame keyboard section 22, the panel keyboard section 32 and the film keyboard section 46, essentially uninterrupted except for the representations 50 of the film 14 (and the essentially transparent circuit elements 33 of panel keyboard section 32). Light transmission upwardly through the display section of the calculator passes through the membrane window 52, the frame display section 21, the panel display section 30 and the film display section 42 essentially uninterrupted except for the opaque activated elements of the liquid crystal display. Light transmission upwardly through the data processing section of the calculator is blocked by the opaque printing in the corresponding region of the membrane 19 and, in the absence of such a membrane, at least to some degree by the data processing means (i.e., board 34 and integrated circuit 36) of panel 16 and the solar cells 18.

Figure 1:
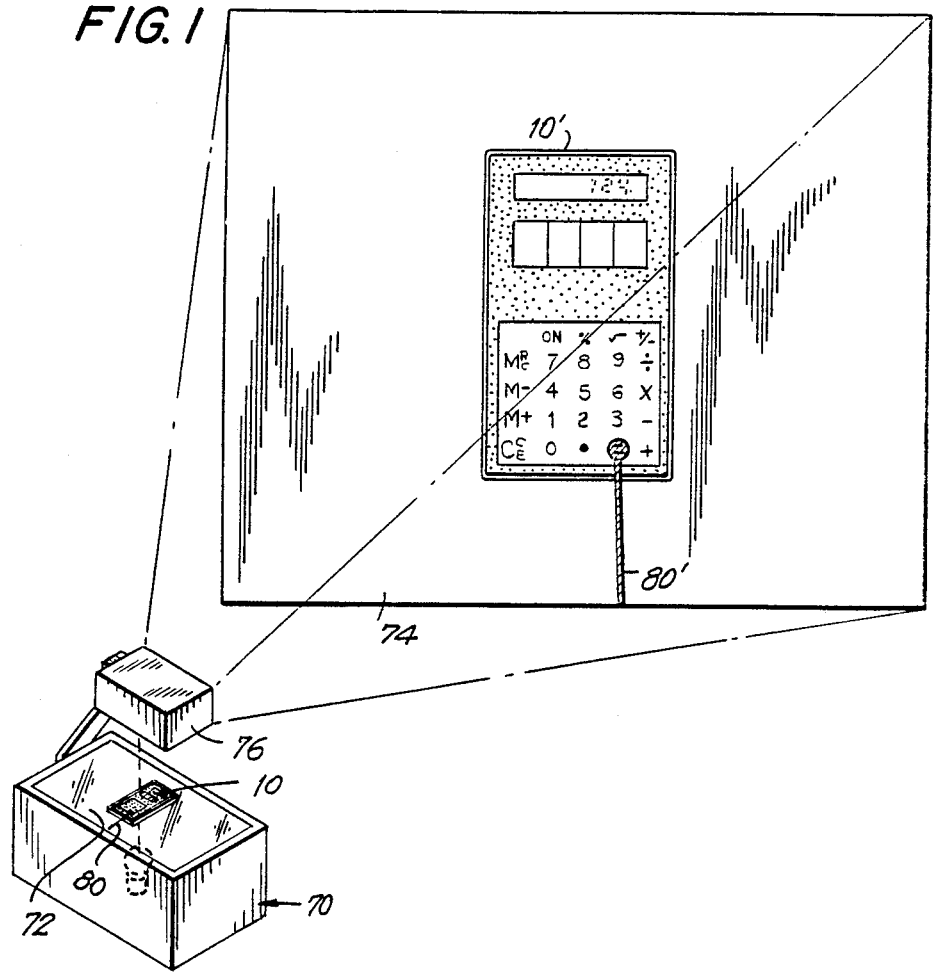
FIG. 1 is a fragmentary- isometric view of a calculator according to the present invention in connection with an overhead projector to project the calculator on a screen, with the instructor's wand actuating a key of the calculator.

The calculator can be used in a conventional hand held manner and, if desired, for classroom instruction, especially to drill students in the use of the operation instruction keys. Referring now to FIG. 1 in particular, therein illustrated is a calculator 10 according to the present invention disposed on a conventional overhead projector 70 for projection onto a screen or the like 74. Such a projector 70 typically includes base housing which includes a light source (not shown) and a transparent or translucent stage 72 which is adapted to support sheets or articles, the content of which is to be projected at an enlarged size on the screen 74. Disposed above the base by a post (not shown), an optical system 76 includes a reflector for reflecting the image produced on the stage 72 onto the projection screen 74. The optical system may include mean for adjusting the height thereof as may be required to focus the image on the screen 74.

In operation, the calculator 10 is placed on the viewing stage 72, the light source is activated and the optical system is adjusted to produce a clear image 10' of the calculator on the screen 74. Such an image is typically constituted by a background that corresponds to the color of the projection screen 74 on which are projected images of the opaque numerals formed in the liquid crystal display 30 and the opaque representations of the film 14.

Additionally, the finger of the instructor manipulating the various keys is projected on the screen. Because the finger is at least partially opaque, the representation being pressed is not projected onto the screen. Because the adult human finger tends to be larger than a representation, the finger is likely also to prevent transmission onto the screen of neighboring representations as well. Finally, because in a larger calculator the operation instruction keys may not be disposed exclusively on the periphery of the keyboard section, the pressing of certain such keys by a finger may require much of that finger to be projected and various other representations to be blocked out by the finger. On the other hand, both for aesthetic reasons and for pedagaogic reasons, it is desirable to allow students an uninterrupted and complete view of the calculator. Accordingly, the present invention further contemplates that the keys of the calculator should be actuated by means of an instructor-held wand 80 (see FIG. 1).

The wand 80 is formed of a transparent, lightly colored or shaded material of suitable length and rigidity so that the hand of the instructor holding the base need not be projected onto the screen 74 at all, but simply the wand head and a portion of the wand shank. The head of the wand is configured and dimensioned so that the tip thereof contacting the calculator keyboard section 46 covers all or most of a given representation 50, but no more. The color or shading of the wand head is selected to enable the representation to be seen through the wand projection 80', while the wand head by its coloring and/or shading indicates to the student the key being selected. In this manner the student is able to follow not only the output display of the calculator, but also the input or keyboard activity producing that output display.

The frame 12 is preferably made of a transparent rigid plastic, such as polyacrylate, t afford rigidity and protection to the calculator while at the same time holding the various components thereof in appropriate juxtaposition. The film 14 is formed of a transparent strong resilient plastic, such as Mylar or polyvinyl chloride, and the membrane 20 may be formed of the same or a similar material. The keyboard section 32 of panel 16 is formed of transparent glass while the printed circuit board 34, integrated circuit 36 and display section 30 of the panel 16 are formed of the materials conventionally used in such elements except that the panels 30' are necessarily formed of transparent material. While the preferred materials for the various components of the calculator have been indicated, obviously other materials affording similar properties may be used as well. While clearly the calculators may vary in size, a relatively simple calculator of the type illustrated may conveniently have dimensions of 112×65×5 millimeters, with the membrane 19 having a thickness of about 0.3 mm; the panel glass, 1.5 mm; the PCB, 0.8 mm; and the film, 0.2 mm.

To summarize, the present invention provides a calculator adapted so that both the output thereof and the input thereto on the operation instruction keys or, if desired, on all keyboard input, can be readily projected for group viewing.

Now that the preferred embodiments of the present invention have been showed and described in detail, various modifications and improvements thereon will become readily apparent to those skilled in the art. Accordingly, the spirit and scope of the present invention is to be limited only by the appended claims, and not by the foregoing specification.

I claim:

1. A calculator for use in conducting classroom demonstrations of the operation thereof, including use of the operation instruction by key means, comprising:
    a housing having a generally transparent frame and a generally transparent film overlying said frame, said housing having a keyboard section, a data processing section, and a display section;
    said keyboard section including a data entry subsection and an operation instruction subsection, said data entry subsection comprising a first set of key means accessible from said film and characterized by opaque data representations thereon for affording the introduction of data into the calculator, and said operation instruction subsection comprising a second set of key means accessible from said film and characterized by opaque operation instruction representations thereon for affording the introduction of operation instructions into the calculator, said data entry subsection and said operation instruction subsection at all times being essentially transparent to light transmission therethrough except for said opaque data and operation instruction representations thereon;
    said data processing section comprising means for processing the data supplied thereto from said first set of key means according to the operation instructions supplied thereto from said second set of key means;
    said display section comprising means for displaying the output of said data processing means, including liquid crystal portions adapted to form numeric outputs that are opaque so as to obstruct light transmission therethrough when said liquid crystal portions are excited, said display section being essentially transparent to light transmission therethrough except for excited liquid crystal portions; and
    opaque solar cell means disposed in said data processing section intermediate said film and said data processing means.

2. A calculator for use in conducting classroom demonstrations of the operation thereof, including use of the operation instruction key means, comprising:
    a housing having a generally transparent frame and a generally transparent film overlying said frame, said housing having a keyboard section, a data processing section, and a displaying section;
    said keyboard section including a data entry subsection and an operation instruction subsection, said data entry subsection comprising a first set of key means accessible from said film and characterized by opaque data representations thereon for affording the introduction of data into the calculator, and said operation instruction subsection comprising a second set of key means accessible from said film and characterized by opaque operation instruction representations thereon for affording the introduction of operation instructions into the calculator, said data entry subsection and said operation instruction subsection at all times being essentially transparent to light transmission therethrough except for said opaque data and operation instruction representations thereon;

said data processing section comprising means for processing the data supplied thereto from said first set of key means according to the operation instructions supplied thereto from said second set of key means;

said display section comprising means for displaying the output of said data processing means, including liquid crystal portions adapted to form numeric outputs that are opaque so as to obstruct light transmission therethrough when said liquid crystal portions are excited, said display section being essentially transparent to light transmission therethrough except for excited liquid crystal portions; and opaque membrane means disposed within said data processing section of said housing behind said data processing means and opaque solar cell means disposed within said data processing section in front of said data processing means, both opaque means cooperatively reducing light transmission through said data processing section to said data processing means, thereby to protect said data processing means from the deleterious effect of light thereon.

3. A calculator for use in conducting classroom demonstrations of the operation thereof, including use of the operation instruction key means, comprising:

a housing having a generally transparent frame, a generally transparent film overlying said frame, and a panel disposed intermediate said film and frame, said housing having a keyboard section at one end, a display section at the other end, and a data processing section intermediate said ends;

said keyboard section including a data entry subsection and an operation instruction subsection, said data entry subsection comprising a first set of key means accessible from said film and characterized by opaque data representations thereon for affording the introduction of data into the calculator, and said operations instruction subsection comprising a second set of key means accessible from said film and characterized by opaque operation instruction representations thereon for affording the introduction of operation instruction into the calculator, said first set of key means of said data entry subsection and said second set of key means of said operation instruction subsection being at all times essentially transparent to light transmission therethrough except for said opaque data and operation instruction representations thereon;

said data processing section comprising means for processing the data supplied thereto from said first set of key means according to the operation instructions supplied thereto from said second set of key means, said data processing section being essentially opaque to light transmission therethrough and including opaque solar cell means intermediate said film and said data processing means and opaque membrane means behind said frame; and said display section comprising means for displaying the output of said data processing means, including liquid crystal portions adapted to form numeric outputs that are opaque so as to obstruct light transmission therethrough when said liquid crystal portions are excited, said display section being essentially transparent to light transmission therethrough except for excited liquid crystal portions;

said data processing section being disposed intermediate said keyboard and display sections, said data processing means being operatively connected to said first and second sets of key means at one edge and to said display means at an opposed edge;

said film in said keyboard section containing disposed on the back surface thereof opaque conductive ink defining said data and operational instructions representations;

said panel in said display section containing said liquid crystal portions, in said data processing section containing said data processing means, and in said keyboard section defining with said film said key means; said panel for each of said representations in said keyboard section, containing at least one open electrical circuit element normally spaced from said film but adapted to be electrically closed by said conductive ink when an opposed representation is depressed toward said panel, said electrical circuit element being essentially transparent to light transmission therethrough and extending to said data processing means.

4. A calculator for use in conducting classroom demonstrations of the operation thereof, including use of the operation instruction key means, comprising:

a housing having a generally transparent frame and a generally transparent film overlying said frame, said housing having a keyboard section, a data processing section, and a display section;

said keyboard section including a data entry subsection and an operation instruction subsection, said data entry subsection comprising a first set of key means accessible from said film and characterized by opaque data representations thereon for affording the introduction of data into the calculator, and said operation instruction subsection comprising a second set of key means accessible from said film and characterized by opaque operation instruction representations thereon for affording the introduction of operation instructions into the calculator, said first and second sets of key means being at all times essentially transparent to light transmission therethrough except for said opaque data and operation instruction representations thereon;

said data processing section comprising means for processing the data supplied thereto from said first set of key means according to the operation instructions supplied thereto from said second set of key means;

said display section comprising means for displaying the output of said data processing means, including liquid crystal portions adapted to form numeric outputs that are opaque so as to obstruct light transmission therethrough when said liquid crystal portions are excited, said display section being essentially transparent to light transmission therethrough except for excited liquid crystal portions;

said film, in said keyboard section, containing disposed on the back surface thereof opaque conductive ink defining said data and operational instruction representations; and a panel disposed intermediate said film and said frame, said panel in said display section containing said liquid crystal portions, in said data processing section containing said data processing means, and in said keyboard section defining with said film said key means, said panel, for each of said representation, containing at least one open electrical circuit element normally spaced from said film, but adapted to be electrically closed by said conductive ink when an opposed representation is depressed toward said panel, said electrical circuit element being essentially transparent to light transmission therethrough and extending to said data processing means.

* * * * *